United States Patent
Neill et al.

(10) Patent No.: US 12,367,410 B2
(45) Date of Patent: Jul. 22, 2025

(54) COMPOSITE QUANTUM GATE CALIBRATION

(71) Applicant: Google LLC, Mountain View, CA (US)

(72) Inventors: Charles James Neill, Goleta, CA (US); Vadim Smelyanskiy, Mountain View, CA (US); Yu Chen, Goleta, CA (US); Xiao Mi, Goleta, CA (US); Yuezhen Niu, El Segundo, CA (US); Kostyantyn Yevgenovych Kechedzhi, Santa Monica, CA (US); Alexander Nikolaevich Korotkov, Riverside, CA (US); Zhang Jiang, El Segundo, CA (US)

(73) Assignee: GOOGLE LLC, Mountain View, CA (US)

( * ) Notice: Subject to any disclaimer, the term of this patent is extended or adjusted under 35 U.S.C. 154(b) by 1058 days.

(21) Appl. No.: 17/218,690

(22) Filed: Mar. 31, 2021

(65) Prior Publication Data

US 2021/0304054 A1    Sep. 30, 2021

Related U.S. Application Data

(60) Provisional application No. 63/002,764, filed on Mar. 31, 2020.

(51) Int. Cl.
  *G06N 10/20* (2022.01)
  *G06F 15/16* (2006.01)
  *G06N 10/70* (2022.01)

(52) U.S. Cl.
  CPC ............. *G06N 10/20* (2022.01); *G06F 15/16* (2013.01); *G06N 10/70* (2022.01)

(58) Field of Classification Search
  CPC ........ G06N 10/00; G06N 10/20; G06N 10/70; G06F 15/16
  See application file for complete search history.

(56) References Cited

U.S. PATENT DOCUMENTS

| | | | |
|---|---|---|---|
| 10,275,717 B2 | 4/2019 | Babbush et al. | |
| 10,673,624 B2 | 6/2020 | Oba et al. | |
| 2019/0007051 A1* | 1/2019 | Sete | G06N 10/00 |

OTHER PUBLICATIONS

Ivanov, S. et al., "Composite two-qubit gates", https://journals.aps.org/pra/abstract/10.1103/PhysRevA.92.022333 (Year: 2015).*

(Continued)

*Primary Examiner* — Alexey Shmatov
*Assistant Examiner* — Devika S Maharaj
(74) *Attorney, Agent, or Firm* — DORITY & MANNING P.A.

(57) ABSTRACT

Systems and methods for composite quantum gate calibration for a quantum computing system are provided. In some implementations, a method includes accessing a unitary gate model describing a composite quantum gate. The unitary gate model includes a plurality of gate parameters. The method includes implementing the composite quantum gate for a plurality of gate cycles on the quantum system to amplify the plurality of gate parameters. The method includes obtaining a measurement of a state of the quantum system after implementing the composite quantum gate for the plurality of gate cycles. The method includes determining at least one of the plurality of gate parameters based at least in part on the measurement of the state of the quantum system. The method includes calibrating the composite quantum gate for the quantum computing system based at least in part on the plurality of gate parameters.

20 Claims, 13 Drawing Sheets

(56) References Cited

OTHER PUBLICATIONS

International Preliminary Report on Patentability for Application No. PCT/US2021/025117, mailed Oct. 13, 2022, 14 pages.
Boixo et al., "Characterizing Quantum Supremacy in Near-Term Devices", arXiv:1608.00263v3, Apr. 5, 2017, 23 pages.
Foxen et al., "Demonstrating a Continuous Set of Two-qubit Gates for Near-term Quantum Algorithms", arXiv:2001.08343v2, Feb. 3, 2020, 20 pages.
Google AI Quantum, "Supplementary information for "Quantum supremacy using a programmable superconducting processor"", arXiv:1910.11333v2, Dec. 28, 2019, 67 pages.
International Preliminary Report on Patentability for Application No. PCT/US2021/025117, mailed Jul. 16, 2021, 19 pages.
Kimmel et al., "Robust Calibration of a Universal Single-Qubit Gate-Set via Robust Phase Estimation", arXiv:1502.02677v2, Nov. 6, 2015, 15 pages.
Kivlichan et al., "Quantum Simulation of Electronic Structure with Linear Depth and Connectivity", Physical Review Letters 120, No. 11, 2018, 6 pages.
Knill et al., "Randomized Benchmarking of Quantum Gates", arXiv:0707.0963v1, Jul. 6, 2007, 13 pages.
Magesan et al., "Robust randomized benchmarking of quantum processes", arXiv:1009.3639v1, Sep. 19, 2010, 5 pages.
Stack Exchange, "Quantum Supremacy: Some questions on cross-entropy benchmarking", Oct. 23, 2019, https://quantumcomputing.stackexchange.com/questions/8427/quantum-supremacy-some-questions-on-cross-entropy-benchmarking, retrieved on Aug. 3, 2021, 6 pages.
Boxio et al., "Characterizing Quantum Supremacy in Near-Term Devices", arXiv:1608.00263v3, Apr. 5, 2017, 23 pages.
Kimmel et al., "Robust Calibration of a Universal Single-Qubit Gate-Set via Robust Phase Estimation", arXiv:1502.02677v3, Oct. 21, 2021, 15 pages.
Kivlichan et al., "Quantum Simulation of Electronic Structure with Linear Depth and Connectivity", arXiv:1711.04789v2, Feb. 3, 2018, 8 pages.
Knill et al., "Randomized Benchmarking of Quantum Gates", Physical Review A, vol. 77, No. 1, 2008, 7 pages.
Magesan et al., "Scalable and Robust Randomized Benchmarking of Quantum Processes", arXiv:1009.3639v1, Sep. 19, 2010, 5 pages.

\* cited by examiner

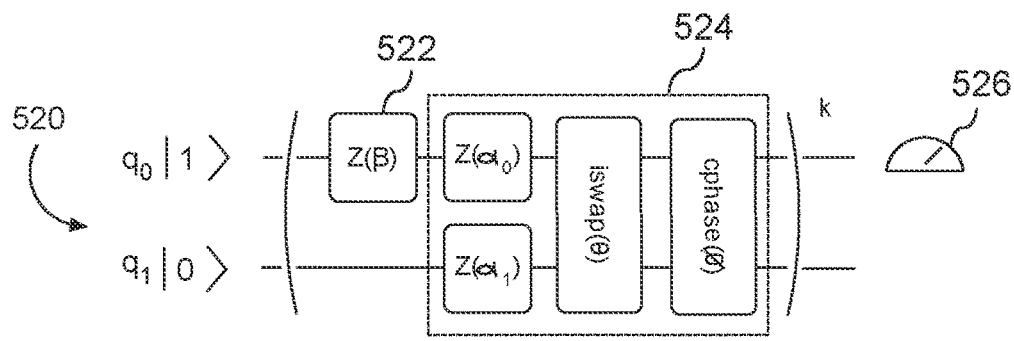
FIG. 12
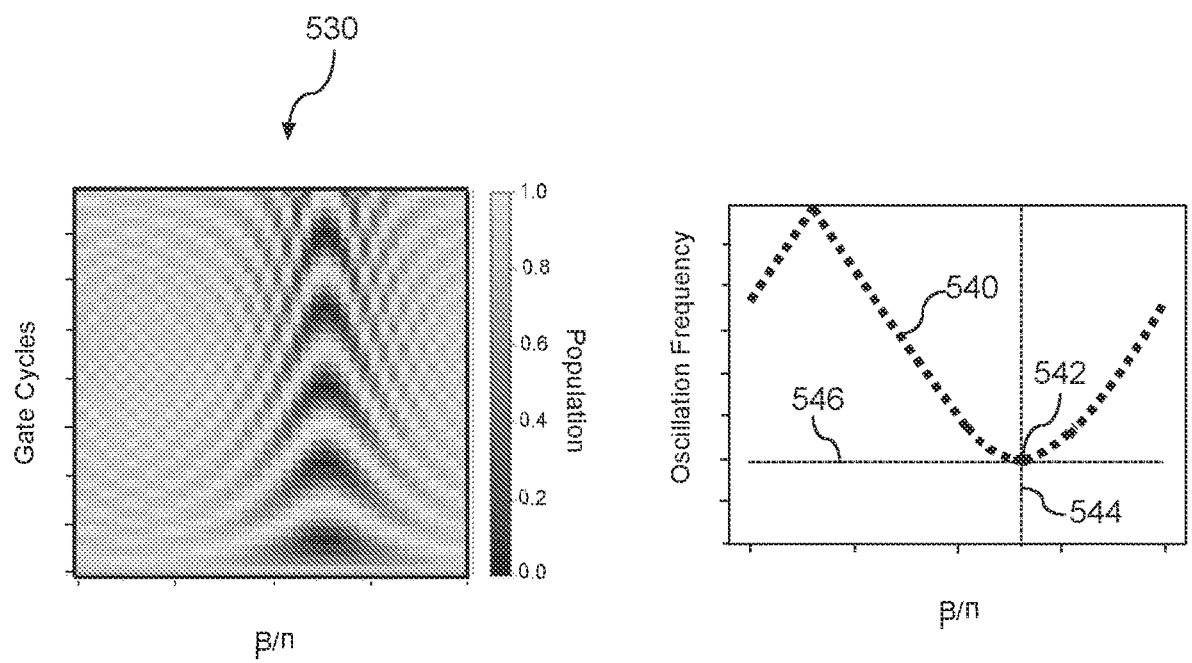
FIG. 13
FIG. 14

COMPOSITE QUANTUM GATE CALIBRATION

PRIORITY CLAIM

The present application claims the benefit of priority of U.S. Provisional Application Ser. No. 63/002,764, filed on Mar. 31, 2020, titled "Composite Quantum Gate Calibration," which is incorporated herein by reference.

FIELD

The present disclosure relates generally to quantum computing systems, and more particularly to calibrating composite quantum gates (e.g., two-qubit quantum gates) in quantum computing systems.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle + b|1\rangle$ The "0" and "1" states of a digital computer are analogous to the $|0\rangle$ and $|1\rangle$ basis states, respectively, of a qubit.

SUMMARY

Aspects and advantages of embodiments of the present disclosure will be set forth in part in the following description, or can be learned from the description, or can be learned through practice of the embodiments.

One example aspect of the present disclosure is directed to a method for calibrating a quantum computing system used to implement a quantum circuit on a quantum system having a plurality of qubits. The quantum circuit includes a composite quantum gate. The method includes accessing, by one or more computing devices, a unitary gate model describing the composite quantum gate. The unitary gate model includes a plurality of gate parameters. The method includes implementing, by the one or more computing devices, the composite quantum gate for a plurality of gate cycles on the quantum system to amplify the plurality of gate parameters. The method includes obtaining, by the one or more computing devices, a measurement of a state of the quantum system after implementing the composite quantum gate for the plurality of gate cycles. The method includes determining, by the one or more computing devices, at least one of the plurality of gate parameters based at least in part on the measurement of the state of the quantum system. The method includes calibrating, by the one or more computing devices, the composite quantum gate for the quantum computing system based at least in part on the plurality of gate parameters.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which:

FIG. 12 depicts an example quantum circuit for obtaining calibration data according to example embodiments of the present disclosure;

FIG. 13 depicts a representation of example calibration data according to example embodiments of the present disclosure;

FIG. 14 depicts an example oscillation frequency function according to example embodiments of the present disclosure;

DETAILED DESCRIPTION

Figure 1:
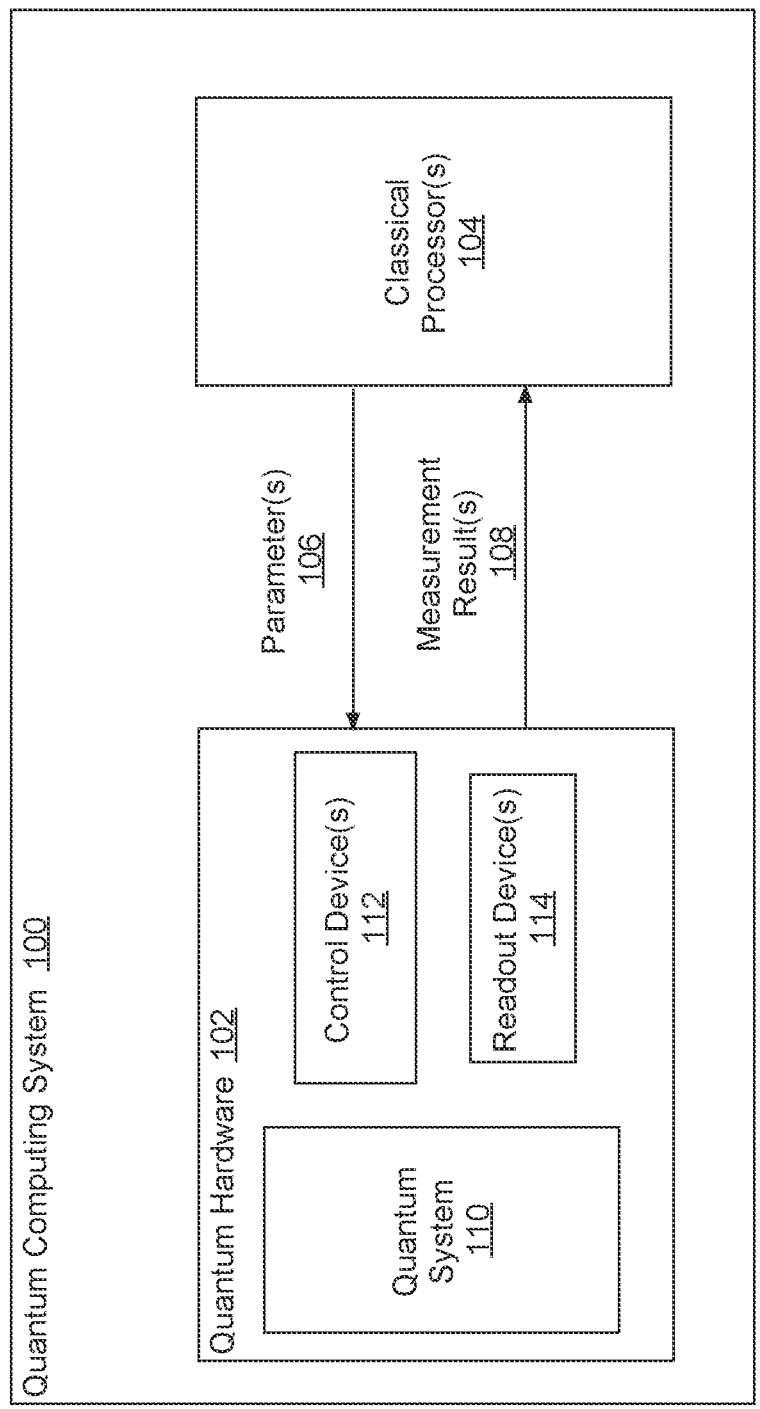
FIG. 1 depicts an example quantum computing system according to example embodiments of the present disclosure.

Example aspects of the present disclosure are directed to systems and methods for calibrating composite quantum gates (e.g., two-qubit quantum gates) in a quantum computing system. Quantum gates can be the building blocks of quantum circuits implemented by quantum computing systems for quantum computation. Composite quantum gates act on more than one qubit (e.g., two qubits, three qubits). Operation of a quantum computer can require characterization and calibration of experimentally realizable quantum gates. Robust and efficient quantum gate characterization provides information about the actualized quantum gates, which can then be used for the subsequent quantum control calibration in a quantum computing system. Quantum control calibration can include, for instance, calibration of control pulses to implement the quantum gates on a quantum system having a plurality of qubits. Quantum gate characterization and calibration are useful for achieving high-fidelity quantum computation and large-scale deployment.

The robustness of a quantum gate calibration protocol can be measured by its ability to extract realistic quantum gate parameters with high accuracy against other compounding imperfections, such as errors in the quantum state preparation and measurements. The efficiency of a calibration protocol can be measured by the total physical runtime for the calibration protocol to achieve a given accuracy. One standard of increased efficiency of a calibration protocol can be reached when the variance of the characterized parameter scales inversely proportional relative to the to an amount of time (e.g., physical runtime) to implement the calibration protocol.

Existing methods and systems for efficient quantum gate characterization are provided for single-qubit quantum gates. However, to realize universal quantum computation, both single-qubit and composite quantum gates are desired. In addition, unwanted qubit-to-qubit interaction due to control errors such as cross talk and environmental defects can also take forms as composite gates. Consequently, robust and efficient composite gate characterization and calibration can be desirable towards achieving universal quantum computation and towards learning and mitigating errors.

Example aspects of the present disclosure provide a calibration protocol for characterizing and calibrating composite quantum gates (e.g., any two-qubit quantum gate). In some embodiments, the calibration protocol can access a model capable of representing an arbitrary unitary operation. The parameters of this model can be learned using the techniques described in calibration protocol(s) according to example aspects of the present disclosure. During the calibration protocol(s), the quantum gate can be repeatedly applied in cyclic fashion for a plurality of gate cycles before taking a measurement of a state of the quantum system. This can coherently amplify the quantum gate parameters without the need for quantum entanglement. The amplification of the quantum gate parameters according to example aspects of the present disclosure can allow for more efficient determination of the quantum gate parameters for a composite quantum gate (e.g., two-qubit quantum gate).

For instance, in some embodiments, an example calibration method can include performing a plurality of measurement instances on a quantum system. Each measurement instance can be associated with implementing a quantum gate for k gate cycles. k can also be referred to as the "amplification factor." Measurement instances can be associated with a different value of k. For instance, a first measurement instance can be associated with two cycles of implementing the quantum gate before taking a measurement of the state of the quantum system. A second measurement instance can be associated with four cycles of implementing the quantum gate before taking a measurement of the state of the quantum system. A third measurement instance can be associated with sixteen cycles of implementing the quantum gate before taking a measurement of the state of the quantum system, and so forth. In some embodiments, multiple measurement instances can be associated with the same amplification factor. For instance, multiple measurements can be associated with an amplification factor k. Each measurement can be obtained after implementing a quantum gate for k gate cycles.

The repeated gate cycles of implementing the quantum gate can amplify gate parameters. The measurements of the state of the quantum system obtained for each measurement instance can be used to determine the parameters of a model describing a composite quantum gate according to example embodiments of the present disclosure. Once the parameters are known, the composite quantum gate can be calibrated for use in a quantum operation and/or to reduce errors.

Example aspects of the present disclosure provide a number of technical effects and benefits. For instance, calibration protocol(s) according to example aspects of the present disclosure can determine composite quantum gate parameters to about 1% accuracy or better to suppress control errors below that of other error sources (e.g., decoherence). In some embodiments, the calibration protocol can achieve increased efficiency in quantum parameter estimation. In some cases, the efficiency can approach the Heisenberg limit, where the accuracy of the estimation increases (e.g., a variance decreases) quadratically faster than certain classical parameter estimation methods (e.g., using a classical processing algorithm). Efficiencies created by the calibration protocol according to example aspects of the present disclosure can approach the Heisenberg limit without the use of entanglement. Given the difficulty of generating large scale entanglement with noisy intermediate scale quantum computers, the methods and systems for calibrating composite quantum gates according to example aspects of the present disclosure can provide unique advantages for characterizing and calibrating quantum computing systems.

With reference now to the FIGS., example embodiments of the present disclosure will be discussed in further detail. As used here, the use of the term "about" in conjunction with a value refers to within 20% of the value.

FIG. 1 depicts an example quantum computing system 100. The example system 100 is an example of a system on one or more classical computers or quantum computing devices in one or more locations, in which the systems, components, and techniques described below can be implemented. Those of ordinary skill in the art, using the disclosures provided herein, will understand that other quantum computing structures or systems can be used without deviating from the scope of the present disclosure.

The system 100 includes quantum hardware 102 in data communication with one or more classical processors 104. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits. In some implementations, the multi-level quantum subsystems can include superconducting qubits, such as flux qubits, charge qubits, transmon qubits, gmon qubits, etc.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (e.g., with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum gates or quantum circuits having a plurality of quantum gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust the frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 102 through physical control parameters (e.g., microwave pulses) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

The readout device(s) 114 can take advantage of a difference in the impedance for the |0⟩ and |1⟩ states of an element of the quantum system, such as a qubit, to measure the state of the element (e.g., the qubit). For example, the resonance frequency of a readout resonator can take on different values when a qubit is in the state |0⟩ or the state |1⟩, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

Figure 2:
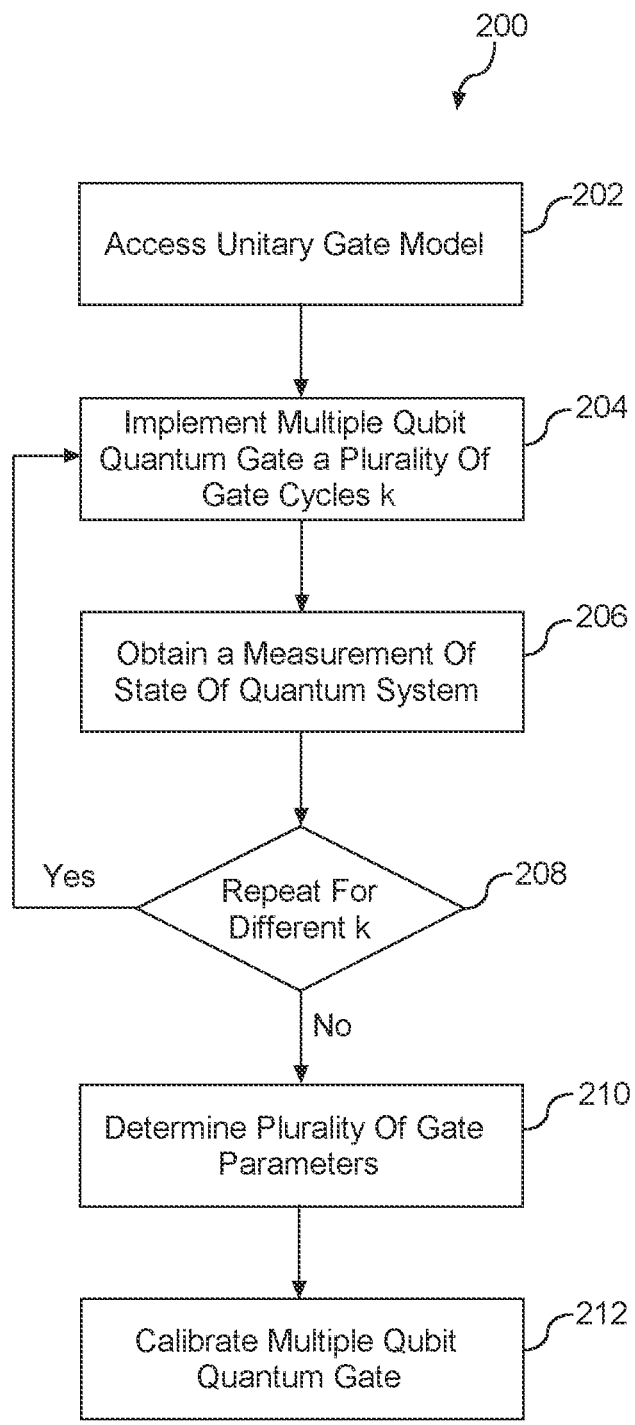
FIG. 2 depicts a flow diagram of an example method according to example embodiments of the present disclosure.

FIG. 2 depicts a flow diagram of an example method (200) for calibrating parameters of a composite quantum gate (e.g., a two-qubit quantum gate) according to example embodiments of the present disclosure. The method (200) can be implemented using any suitable system, such as the system 100 shown in FIG. 1 or the system 1000 shown in FIG. 21. FIG. 2 depicts steps performed in a particular order for purposes of illustration and discussion. Those of ordinary skill in the art, using the disclosures provided herein, will understand that various steps of any of the methods described herein can be adapted, expanded, omitted, rearranged, include steps not illustrated, performed simultaneously, and/or modified in various ways without deviating from the scope of the present disclosure.

At (202), the method includes accessing a unitary gate model. The unitary gate model can describe the composite quantum gate (e.g., two-qubit quantum gate). The unitary gate model can include a plurality of gate parameters. More particularly, in some embodiments, the model can describe the composite quantum gate as a unitary fermionic sim gate $U_{FSIM}$. The $U_{FSIM}$ gate can include five gate parameters, including a first gate parameter $\psi$, a second gate parameter $\Phi$, a third gate parameter $\varphi$, a fourth gate parameter $\theta$, and fifth gate parameter $\chi$. A definition of a $U_{FSIM}$ gate is set forth below:

$$= \begin{pmatrix} 1 & 0 & 0 & 0 \\ 0 & e^{-i(\varphi+\Psi+S_B)}\cos[\theta] & -i\, e^{i(\chi-\Psi-S_A)}\sin[\theta] & 0 \\ 0 & -i\, e^{-i(\chi-\Psi-S_B)}\sin[\theta] & e^{i(\varphi+\Psi-S_A)}\cos[\theta] & 0 \\ 0 & 0 & 0 & e^{-i(\varphi+2\Psi+S_A+S_B)} \end{pmatrix}$$

Control parameters $S_A$ and $S_B$ are realized by implementing a single qubit Z gate (Pauli Z gate) before the composite quantum gate. The Z gate can have a matrix representation of the following form:

$$\begin{pmatrix} 1 & 0 & 0 & 0 \\ 0 & e^{-iS_B} & 0 & 0 \\ 0 & 0 & e^{-iS_A} & 0 \\ 0 & 0 & 0 & e^{-i(S_A+S_B)} \end{pmatrix}$$

Aspects of the present disclosure provide a calibration protocol to learn the five parameters $\chi$, $\theta$, $\varphi$, $\Phi$ and $\psi$ so that any composite quantum gate can be learned with precision and represented by the model corresponding to the $U_{FSIM}$ gate.

Figure 3:
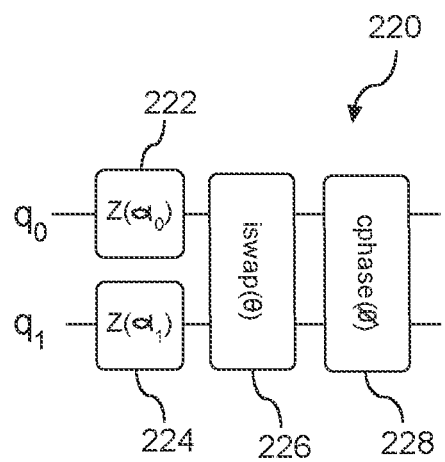
FIG. 3 depicts an example circuit representation of a model of a composite quantum gate according to example embodiments of the present disclosure.

In some embodiments, the $U_{FSIM}$ gate representing the two-qubit quantum gate can be modeled as the set of quantum gates 220 shown in FIG. 3. More particularly, the $U_{FSIM}$ gate can be modeled as a first Z rotation angle gate 222 for a first qubit $q_0$, a second Z rotation angle gate 224 for a second qubit $q_1$, an iSWAP gate 226 for the first qubit $q_0$ and the second qubit $q_1$, and a controlled phase gate 228 for the first qubit $q_0$ and the second qubit $q_1$. The first Z rotation angle gate 222 can be for angle $\alpha0$. The second Z rotation angle gate 224 can be for $\alpha1$. In some embodiments, the third gate parameter $\varphi$ can be defined as follows:

$$\varphi=2(\alpha0-\alpha1)$$

The iSWAP gate 226 can be for angle $\theta$. The controlled phase gate 228 can be for angle $\Phi$.

Referring back to FIG. 2, the method (200) can include repeating the composite quantum gate over and over for a number of gate cycles to amplify the gate parameters. More particularly, the method can include implementing a plurality of measurement instances. For each measurement instance, the method can include repeating the quantum gate for k cycles. The number k can also be referred to as the amplification factor. The method can then obtain a measurement of the state of the quantum system (e.g., a plurality of qubits in the quantum system). Data associated with this measurement can be stored, for instance, as a record in one or more memory devices for use in learning the gate parameters as described in detail below. The method can then implement other measurement instances. These measurement instances can include a different number of gate cycles k for repeating the quantum gate (e.g., can be associated with a different amplification factor) prior to obtaining a measurement. Data associated with this measurement can be stored, for instance, as a record in one or more memory devices for use in learning the gate parameters as described in detail below This amplification of gate parameters is represented as (204), (206), and (208) of FIG. 2. More particularly, at (204), the method can include implementing the composite quantum gate for a plurality of gate cycles k. k can be any suitable number, such as 1, 2, 3, 4, 5, 6, 7, 16, 32, 64, etc. k can also be referred to as the amplification factor for a measurement instance. Example k values are provided for purposes of illustration and discussion. Those of ordinary skill in the art, using the disclosures provided herein, will understand that any value of k can be used without deviating from the scope of the present disclosure.

At (206), the method can include obtaining a measurement of a state of the quantum system. More particularly, the method can include obtaining a state of the plurality of qubits (e.g., a first qubit and a second qubit) after implementation of the composite quantum gate for k gate cycles. The measurement(s) can be stored as a record in one or more memory devices for use in determining gate parameters according to example aspects of the present disclosure. In some embodiments, the method can also include performing multiple measurement instances for the same value of k. In this way, multiple measurements of a quantum state can be obtained for the same amplification factor.

At (208), the method can include determining whether to repeat (204) and (206) (e.g., conduct another measurement instance) for a different value k. If so, the method can return to (204) to implement the composite quantum gate for a plurality of gate cycles k and obtain a measurement of the state of the quantum system (206). This process can continue until it is determined at (208) that no more measurement instances are needed.

Figure 4:
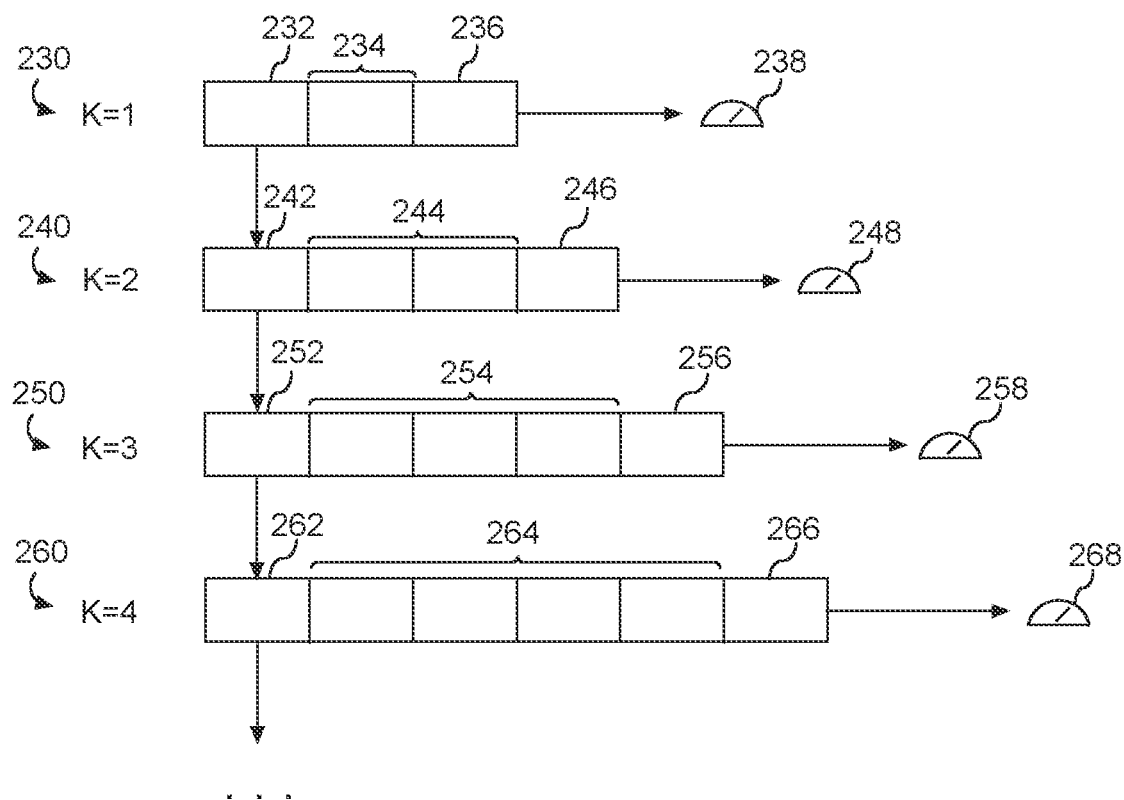
FIG. 4 depicts an overview of example amplification of quantum gate parameters according to example embodiments of the present disclosure.

FIG. 4 provides an overview of implementing a plurality of measurement instances with each measurement instance associated with a different number of gate cycles k to amplify gate parameters according to example embodiments of the present disclosure. For example, a first measurement instance 230 can be associated with a gate cycle k value of 1. The first measurement instance 230 can include, for instance, a preparation phase 232. The preparation phase 232 can include implementing one or more quantum gates and/or control pulses to prepare the qubits in the quantum system for calibration. The first measurement instance 230 can include a gate cycle phase 234 that implements the composite quantum gate for k gate cycles, such as a single gate cycle. The first measurement instance 230 includes a readout phase 236. The readout phase 236 can implement one or more quantum gates and/or control pulses to prepare the qubits in the quantum system for a measurement. The first measurement instance 230 can finally include a measurement 238 where the state of the qubits in the quantum system are measured.

A second measurement instance 240 can be associated with a gate cycle k value of 2. The second measurement instance 240 can include, for instance, a preparation phase 242. The preparation phase 242 can include implementing one or more quantum gates and/or control pulses to prepare the qubits in the quantum system for calibration. The second measurement instance 240 can include a gate cycle phase 244 that implements the composite quantum gate for k gate cycles, such as two gate cycles. The second measurement instance 240 includes a readout phase 246. The readout phase 246 can implement one or more quantum gates and/or control pulses to prepare the qubits in the quantum system for a measurement. The second measurement instance 240 can finally include a measurement 248 where the state of the qubits in the quantum system are measured.

A third measurement instance 250 can be associated with a gate cycle k value of 3. The third measurement instance 250 can include, for instance, a preparation phase 252. The preparation phase 252 can include implementing one or more quantum gates and/or control pulses to prepare the qubits in the quantum system for calibration. The third measurement instance 250 can include a gate cycle phase 254 that implements the composite quantum gate for k gate cycles, such as three gate cycles. The third measurement instance 250 includes a readout phase 256. The readout phase 256 can implement one or more quantum gates and/or control pulses to prepare the qubits in the quantum system for a measurement. The third measurement instance 250 can finally include a measurement 258 where the state of the qubits in the quantum system are measured.

A fourth measurement instance 260 can be associated with a gate cycle k value of 4. The fourth measurement instance 260 can include, for instance, a preparation phase 262. The preparation phase 262 can include implementing one or more quantum gates and/or control pulses to prepare the qubits in the quantum system for calibration. The fourth measurement instance 260 can include a gate cycle phase 264 that implements the composite quantum gate for k gate cycles, such as four gate cycles. The fourth measurement instance 260 includes a readout phase 266. The readout phase 266 can implement one or more quantum gates and/or control pulses to prepare the qubits in the quantum system for a measurement. The fourth measurement instance 260 can finally include a measurement 268 where the state of the qubits in the quantum system are measured.

FIG. 4 depicts four measurement instances for purposes of illustration and discussion. Those of ordinary skill in the art, using the disclosures provided herein, will understand that any number of measurement instances can be included without deviating from the scope of the present disclosure. In addition, the values of k can vary in any suitable manner for the different measurement instances. As will be discussed in detail below, in some embodiments, the number of gate cycles k for a measurement instance increases by an exponential factor relative to a number of gate cycles for a previous measurement instance.

Referring back to FIG. 2, the method can then determine the plurality of gate parameters (210) based on the obtained measurements as will be described in detail below. At (212) the method can include calibrating the composite quantum gate in the quantum computing system based on the gate parameters. For instance, control pulses and/or other control parameters used to implement the composite quantum gate in a quantum computing system can be adjusted and/or controlled to achieve higher accuracy implementation of the quantum gate and/or to reduce errors.

Figure 5:
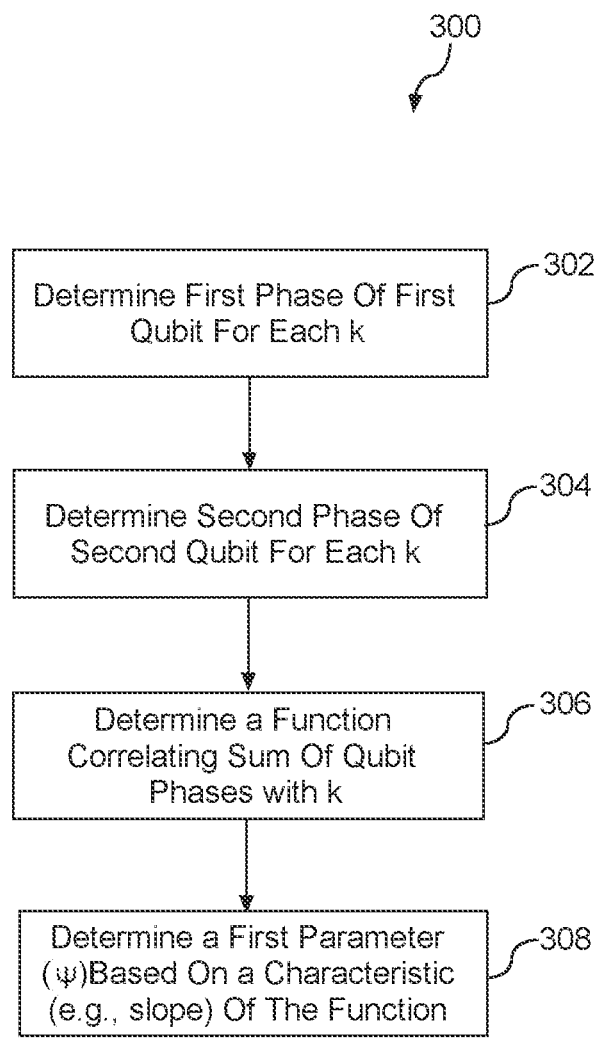
FIG. 5 depicts a flow diagram of an example method according to example embodiments of the present disclosure.

FIG. 5 depicts a flow diagram of an example method (300) for determining the first gate parameter $\psi$ according to example embodiments of the present disclosure. The method (300) can be implemented using any suitable system, such as the system 100 shown in FIG. 1 or the system 1000 shown in FIG. 21. FIG. 5 depicts steps performed in a particular order for purposes of illustration and discussion. Those of ordinary skill in the art, using the disclosures provided herein, will understand that various steps of any of the methods described herein can be adapted, expanded, omitted, rearranged, include steps not illustrated, performed simultaneously, and/or modified in various ways without deviating from the scope of the present disclosure.

Figure 6:
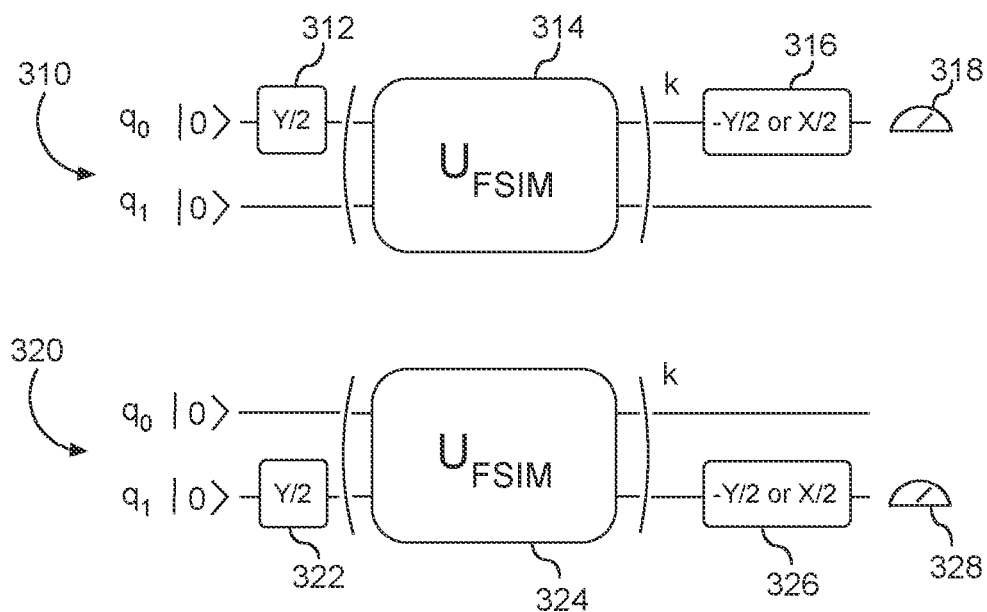
FIG. 6 depicts an example quantum circuit for measurement a qubit phases according to example embodiments of the present disclosure.

At (302), the method can include determining a first phase of a first qubit in the quantum system as a function k, wherein k is the number of gate cycles used to amplify the first gate parameter $\psi$. FIG. 6 depicts a circuit diagram of an example quantum circuit 310 used to determine the first phase of the first qubit $q_0$ as a function of k gate cycles of the composite quantum gate according to example embodiments of the present disclosure. The quantum circuit 310 implements a Y/2 Pauli gate 312 to apply a rotation to the first qubit $q_0$. For each measurement instance, the quantum circuit 310 implements k gate cycles of the composite quantum gate 314 (with k being different for each measurement instance). The quantum circuit 310 then implements a −Y/2 or X/2 Pauli gate 316 to apply a rotation to the first qubit $q_0$. The quantum circuit 310 then obtains a measurement 318 of the state of the first qubit $q_0$. By applying rotations at the beginning and end of the sequence, the phase of the first qubit $q_0$ can be determined tomographically. For instance, the final rotation angle of −Y/2 (or X/2) allows measurement of <X> (or <Y> in the event of X/2 rotation). The complex number of <X>+i<Y> represents a projection of the qubit state in an XY plane. The phase of <X>+i<Y> is the phase of the first qubit $q_0$.

At (304), the method can include determining a second phase of a second qubit in the quantum system as a function k, wherein k is the number of gate cycles used to amplify the first gate parameter $\psi$. FIG. 6 depicts a circuit diagram of an example quantum circuit 320 used to determine the second phase of the second qubit $q_0$ as a function of k gate cycles of the composite quantum gate according to example embodiments of the present disclosure. The quantum circuit 320 implements a Y/2 Pauli gate 322 to apply a rotation to the second qubit $q_1$. For each measurement instance, the quantum circuit 320 implements k gate cycles of the composite quantum gate 314 (with k being different for each measurement instance). The quantum circuit 320 then implements a −Y/2 or X/2 Pauli gate 326 to apply a rotation to the second qubit $q_1$. The quantum circuit 320 then obtains a measurement 328 of the state of the second qubit $q_1$. By applying rotations at the beginning and end of the sequence, the phase of the second qubit $q_1$ can be determined tomographically. For instance, the final rotation angle of −Y/2 (or X/2) allows measurement of <X> (or <Y> in the event of X/2 rotation). The complex number of <X>+i<Y> represents a projection of the qubit state in an XY plane. The phase of <X>+i<Y> is the phase of the second qubit $q_1$.

Figure 7:
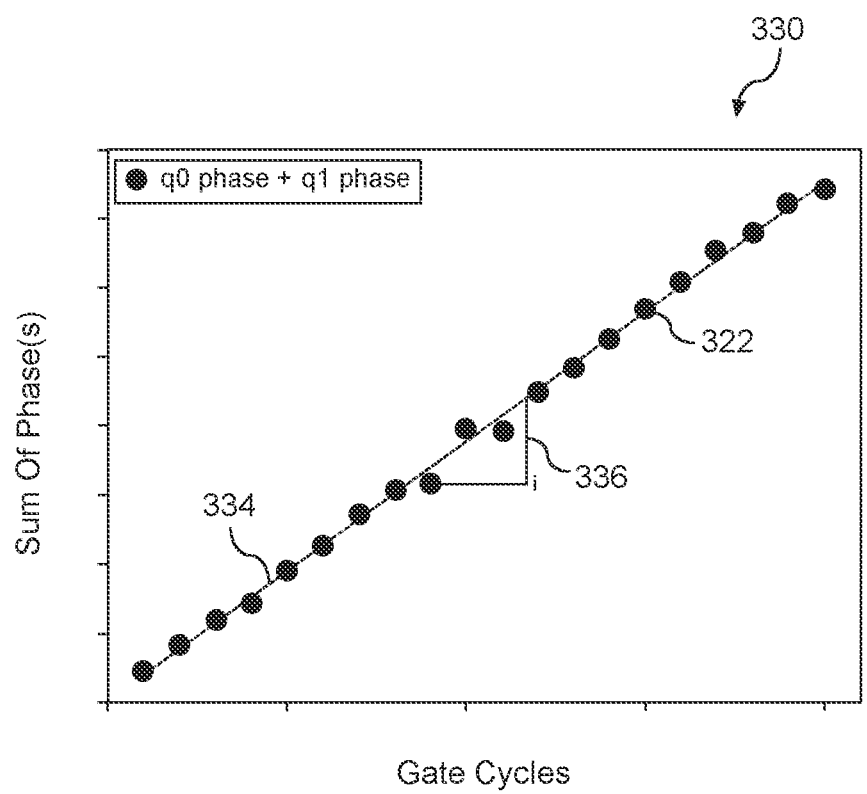
FIG. 7 depicts a representation of a function correlating a sum of phases of a first qubit and a second qubit according to example embodiments of the present disclosure.

At (306) of FIG. 5, the method can include determining a function correlating a sum of the first phase and the second phase with k. For instance, FIG. 7 depicts a graphical representation of an example function 330 correlating a sum of the first phase and the second phase with k. FIG. 7 plots the number of gate cycles along the horizontal axis and sum of the first phase and the second phase along the vertical axis. Each point 332 represents the sum of the first phase and the second phase for a certain value of k. As shown, the function 330 can be represented by a generally linear function 334 that is fit to the points 332 (e.g., using any suitable fitting technique).

At (308), the method can include determining the first gate parameter $\psi$ based at least in part on a characteristic associated with the function correlating the sum of the first phase and the second phase with k. In some embodiments, the first gate parameter $\psi$ is determined as the slope of the function. Referring to FIG. 7, the first gate parameter $\psi$ is determined as the slope 336 of the generally linear function 334.

Figure 8:
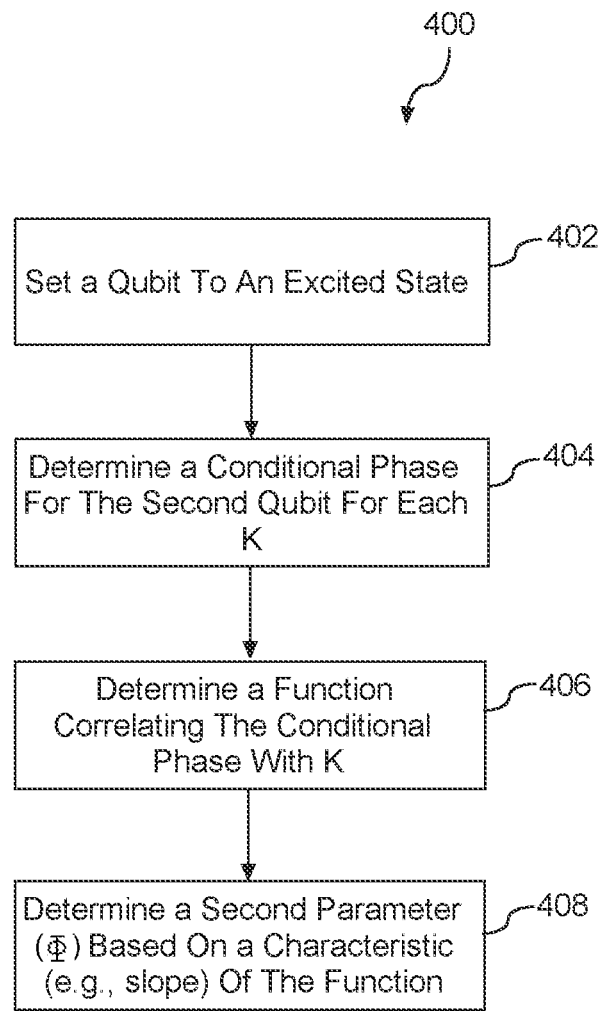
FIG. 8 depicts a flow diagram of an example method according to example embodiments of the present disclosure.

FIG. 8 depicts a flow diagram of an example method (400) for determining the second gate parameter $\Phi$ according to example embodiments of the present disclosure. The method (400) can be implemented using any suitable system, such as the system 100 shown in FIG. 1 or the system 1000 shown in FIG. 21. FIG. 8 depicts steps performed in a particular order for purposes of illustration and discussion. Those of ordinary skill in the art, using the disclosures provided herein, will understand that various steps of any of the methods described herein can be adapted, expanded, omitted, rearranged, include steps not illustrated, performed simultaneously, and/or modified in various ways without deviating from the scope of the present disclosure.

At (402), the method can include setting a qubit to an excited state, such as a |1> state. For instance, the method can include setting a first qubit $q_0$ to an excited state, such as such as a |1> state. At (404), the method can include determining a conditional phase of a second qubit for each as a function k, wherein k is the number of gate cycles used to amplify the second gate parameter $\Phi$. Setting the first qubit $q_0$ to an excited state changes the phase of the second qubit $q_1$. The difference in qubit phase when setting the first qubit between the |0> state and |1> state is the conditional phase.

Figure 9:
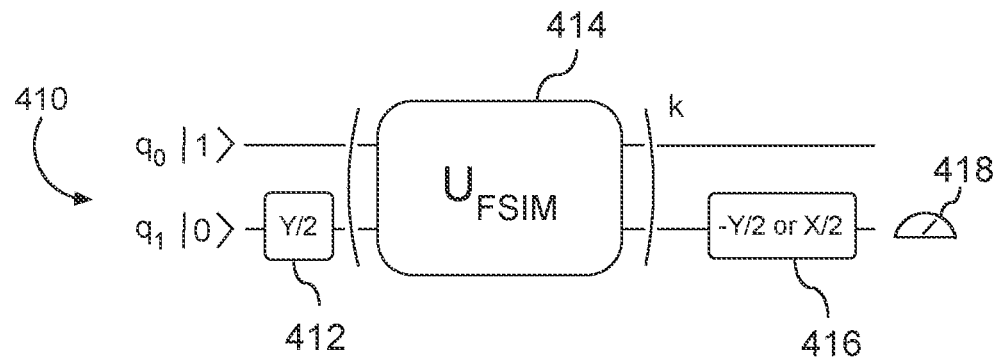
FIG. 9 depicts an example quantum circuit for measurement of a conditional phase according to example embodiments of the present disclosure.

FIG. 9 depicts a circuit diagram of an example quantum circuit 410 used to determine the conditional of the second qubit $q_0$ as a function of k gate cycles of the composite quantum gate according to example embodiments of the present disclosure. As shown, the first qubit is set to the excited state |1>. The quantum circuit 410 implements a Y/2 Pauli gate 412 to apply a rotation to the second qubit $q_1$. For each measurement instance, the quantum circuit 410 implements k gate cycles of the composite quantum gate 414 (with k being different for each measurement instance). The quantum circuit 410 then implements a −Y/2 or X/2 Pauli gate 416 to apply a rotation to the second qubit $q_1$. The quantum circuit 320 then obtains a measurement 418 of the state of the second qubit $q_1$. By applying rotations at the beginning and end of the sequence, the phase of the second qubit $q_1$ can be determined tomographically. The difference in phase when setting the first qubit $q_0$ to the excited state is the conditional phase.

FIGS. 8 and 9 are discussed with reference to setting the first qubit to an excited state and determining the conditional phase of the second qubit for purposes of illustration and discussion. Those of ordinary skill in the art, using the disclosures provided herein, will understand that the method can include setting the second qubit to an excited state and determining the conditional phase of the first qubit without deviating from the scope of the present disclosure.

Figure 10:
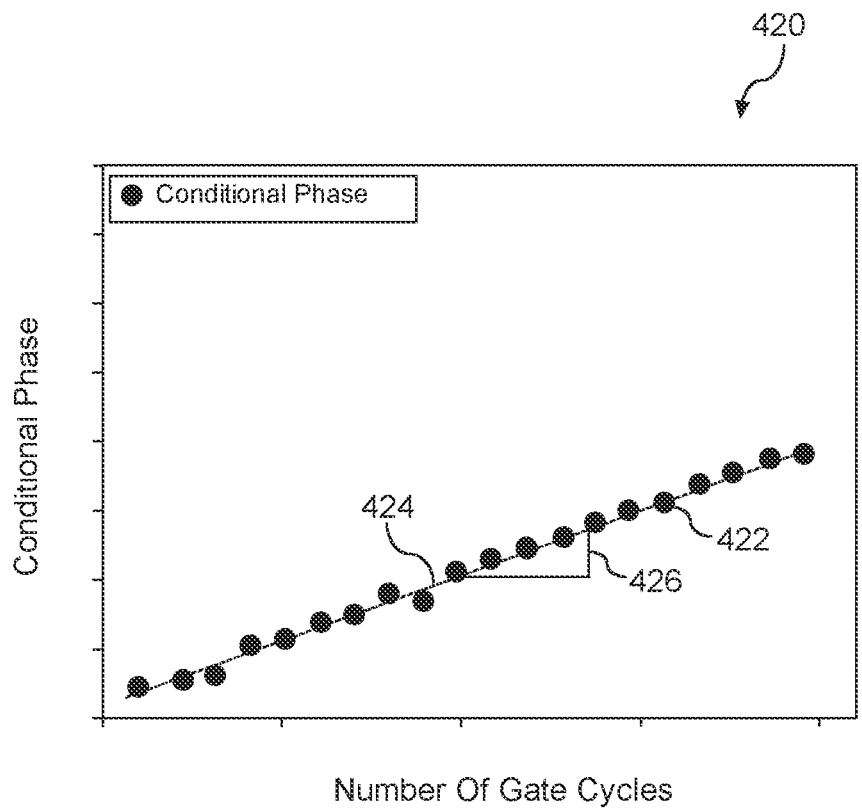
FIG. 10 depicts a representation of a function correlating a conditional phase according to example embodiments of the present disclosure.

At (406) of FIG. 8, the method can include determining a function correlating the conditional phase with k. For instance, FIG. 10 depicts a graphical representation of an example function 420 correlating a conditional phase with k. FIG. 10 the plots number of gate cycles along the horizontal axis and conditional phase along the vertical axis. Each point 422 represents the conditional phase for a certain value of k. As shown, the function 420 can be represented by a generally linear function 4244 that is fit to the points 422 (e.g., using any suitable fitting technique).

At (408), the method can include determining the second gate parameter Φ based at least in part on a characteristic associated with the function correlating conditional phase with k. In some embodiments, the second gate parameter Φ is determined as the slope of the function. Referring to FIG. 10, the second gate parameter Φ is determined as the slope 426 of the generally linear function 424.

Figure 11:
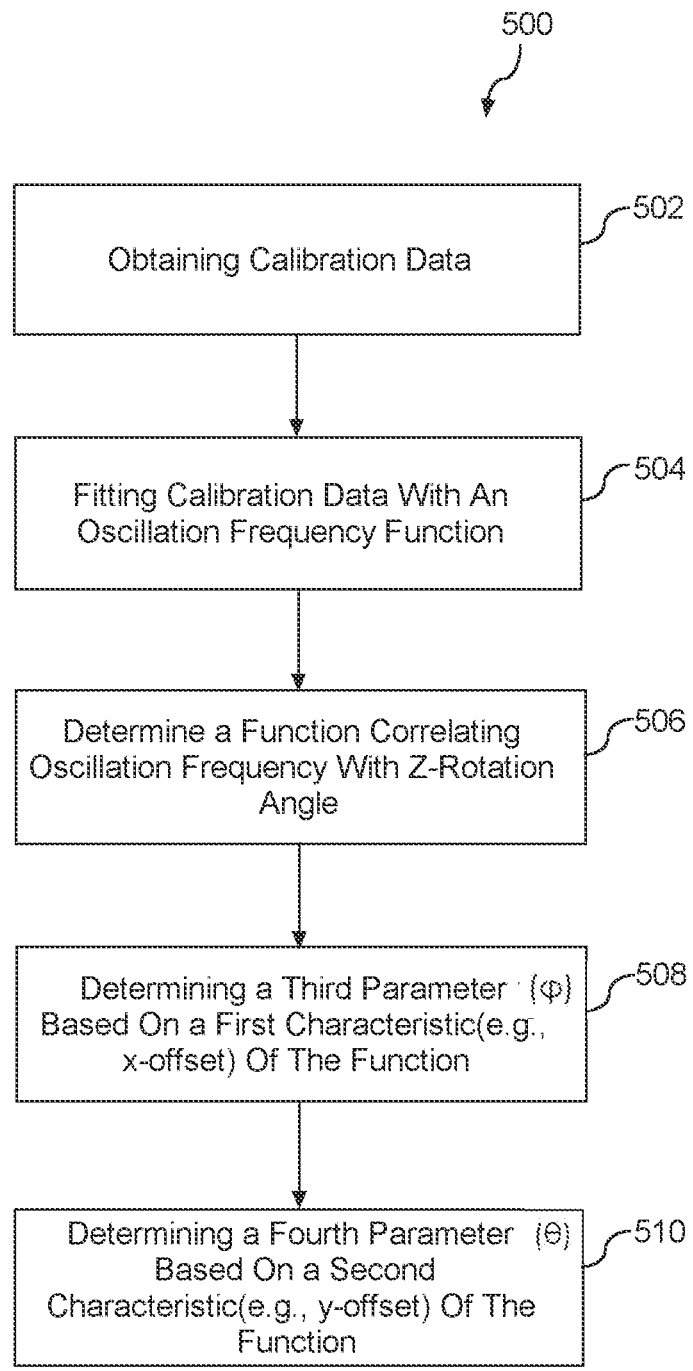
FIG. 11 depicts a flow diagram of an example method according to example embodiments of the present disclosure.

FIG. 11 depicts a flow diagram of an example method (500) for determining the third gate parameter φ and the fourth gate parameter θ according to example embodiments of the present disclosure. The method (500) can be implemented using any suitable system, such as the system 100 shown in FIG. 1 or the system 1000 shown in FIG. 21. FIG. 11 depicts steps performed in a particular order for purposes of illustration and discussion. Those of ordinary skill in the art, using the disclosures provided herein, will understand that various steps of any of the methods described herein can be adapted, expanded, omitted, rearranged, include steps not illustrated, performed simultaneously, and/or modified in various ways without deviating from the scope of the present disclosure.

At (502), the method can include obtaining calibration data. The calibration data can be obtained by implementing the quantum circuit 520 depicted in FIG. 12. More particularly, the quantum circuit 520 can implement a Z rotation angle β in the first qubit $q_0$ with Z(β) Pauli gate 522. For each measurement instance, the quantum circuit 520 implements k gate cycles of the composite quantum gate 524 (with k being different for each measurement instance). As shown, the composite quantum gate 524 can be written as a first Z rotation angle gate for a first qubit $q_0$, a second Z rotation angle gate for a second qubit $q_1$, an iSWAP gate for the first qubit $q_0$ and the second qubit $q_1$, and a controlled phase gate for the first qubit $q_0$ and the second qubit $q_1$. The first Z rotation angle gate 222 can be for angle α0. The second Z rotation angle gate 224 can be for α1. In some embodiments, the third gate parameter φ can be defined as follows:

$\varphi = 2(\alpha 0 - \alpha 1)$

The quantum circuit 520 then obtains a measurement 528 of the state of the first qubit $q_0$. The calibration data can include data indicative of a state of the qubits (e.g. population of the qubits) using measurements obtained for different values of β and different values of k.

FIG. 13 depicts example calibration data 530 obtained using the quantum circuit 520 of FIG. 12. The calibration data 530 represents the population of qubits as a function of both rotation angle β and number of gate cycles k. The calibration data 530 is represented in FIG. 13 as an image. The image includes pixel values representative of population for each β/π and k. The calibration data 530 can be stored or accessed in any suitable format (e.g., table, function, record, list) without deviating from the scope of the present disclosure.

At (504) of FIG. 11, the method includes fitting the calibration data (e.g., calibration data 530) with an oscillation frequency function. More particularly, each column of data (e.g., for each β/π) can be fit into an oscillation frequency function which correlates that oscillation frequency with the z-rotation angle β and k. One example oscillation frequency function is defined as:

$\beta/\pi = 1 - A * \sin(\omega k)^2$ where ω is oscillation frequency.

FIG. 14 depicts a graphical representation of an example oscillation frequency function 540 generated from calibration data 530. FIG. 14 plots z-rotation angle (β/π) along the horizontal axis and oscillation frequency along the vertical axis ω.

At (508), the method includes determining the third gate parameter φ based on a first characteristic of the oscillation frequency function. For instance, the third gate parameter φ can be determined based on the x-offset of a local minima (e.g. x-offset 544 of local minima 542 in FIG. 14) of the oscillation frequency function. In some embodiments, φ/2 can be associated with or equal to the x-offset of the local minima of the oscillation frequency function.

At (510) of FIG. 11, the method includes determining the fourth gate parameter θ based on a second characteristic of the oscillation frequency function. For instance, the fourth gate parameter θ can be determined based on the y-offset of a local minima (e.g. y-offset 546 of local minima 542 in FIG. 14) of the oscillation frequency function. In some embodiments, θ/2 can be associated with or equal to the y-offset of the local minima of the oscillation frequency function.

Figure 15:
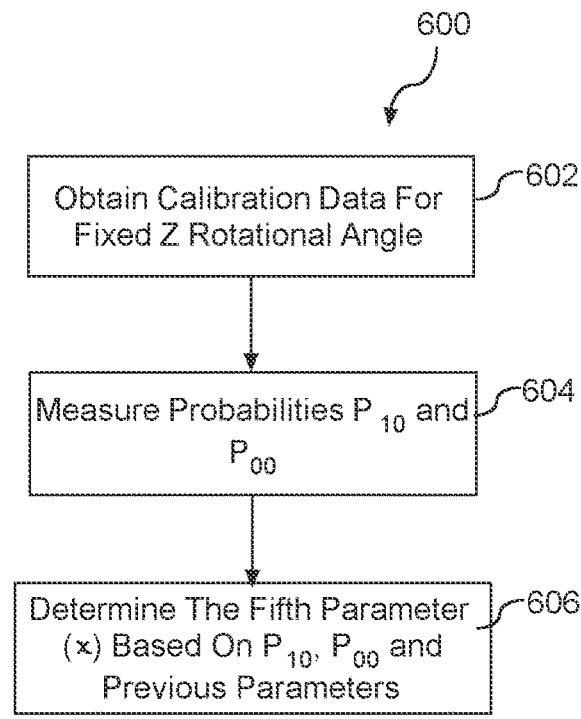
FIG. 15 depicts a flow diagram of an example method according to example embodiments of the present disclosure.

FIG. 15 depicts a flow diagram of an example method (600) for determining the fifth gate parameter χ according to example embodiments of the present disclosure. The method (600) can be implemented using any suitable system, such as the system 100 shown in FIG. 1 or the system 1000 shown in FIG. 21. FIG. 11 depicts steps performed in a particular order for purposes of illustration and discussion. Those of ordinary skill in the art, using the disclosures provided herein, will understand that various steps of any of the methods described herein can be adapted, expanded, omitted, rearranged, include steps not illustrated, performed simultaneously, and/or modified in various ways without deviating from the scope of the present disclosure.

Figure 16:
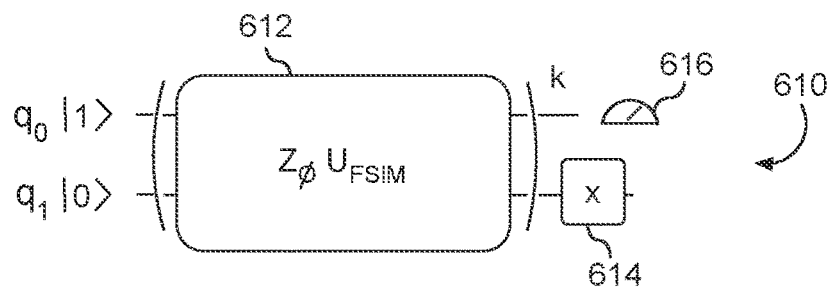
FIG. 16 depicts an example quantum circuit for obtaining calibration data according to example embodiments of the present disclosure.

At (602), the method can include obtaining calibration data similar to (502) in FIG. 11 above, however the z-rotation angle at the beginning of the quantum circuit can be kept constant such that φ-β is equal to a fixed value, such as equal to π/2, where β is the fixed rotation angle. This can be implemented with the quantum circuit 610 shown in FIG. 16. The quantum circuit 610 implements a fixed Z-rotation Zφ followed by k gate cycles of the composite quantum gate 612 (with k being different for each measurement instance). The rotation angle is determined such that α-β is equal to a fixed value, such as equal to π/2, where β is the fixed rotation angle. An X Pauli gate 614 can be applied to the second qubit $q_1$. The quantum circuit 610 obtains a measurement 616 of the state of the first qubit $q_0$.

At (604), the method can include determining a first probability $P_{10}$ and a second probability $P_{00}$ based on the measurements. The first probability $P_{10}$ can be representative of the probability that the state of first and second qubits in the quantum system is |1>|0> (e.g., are in a different state). The second probability $P_{00}$ can be representative of the probability that the state of first and second qubits in the quantum system is |0>|0> (e.g., are in the same state).

At (606), the method can include determining the fifth gate parameter $\chi$ based on the first probability, the second probability, and the previously determined gate parameters. For instance, the fifth gate parameter $\chi$ can be determined using the following relation:

$$P_{01} - P_{00} \propto \sin[d\Psi - \chi]$$

The method can invert and obtain the fifth gate parameter $\chi$ using the above relation given the value of the first gate parameter $\psi$, the third gate parameter $\varphi$, and the fourth parameter $\theta$ that have been previously determined.

Figure 17:
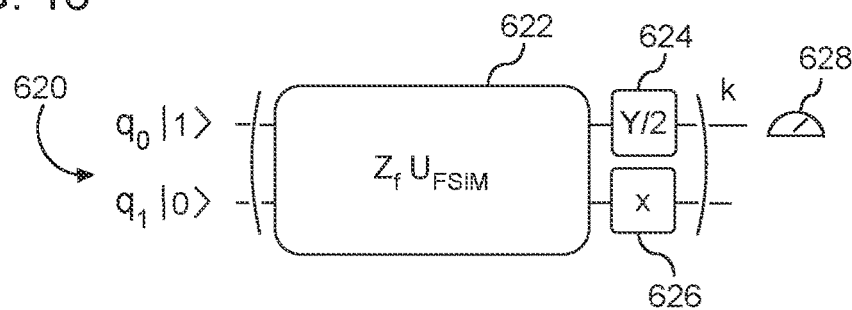
FIG. 17 depicts an example quantum circuit for obtaining calibration data according to example embodiments of the present disclosure.

FIG. 17 depicts another example quantum circuit 620 that can be used to determine the fifth gate parameter $\chi$. The quantum circuit 620 implements a fixed Z-rotation $Z_f$ followed by k gate cycles of the composite quantum gate 622 (with k being different for each measurement instance). The rotation angle f is a fixed rotation angle determined as $\pi/2 - \varphi$. An X Pauli gate 614 can be applied each gate cycle to the second qubit $q_1$. A Y/2 Pauli gate 626 can be applied each gate cycle to the first qubit $q_0$. The quantum circuit 620 obtains a measurement 628 of the state of the first qubit $q_0$. The calibration data obtained using the circuit 620 can be processed according to (604) and (606) of FIG. 15 to determine the fifth gate parameter $\chi$.

Variations and modifications can be made to example embodiments of the present disclosure. For instance, in some embodiments, modifications are made to improve efficiency of the calibration protocol. In some embodiments, the modifications can result in efficiencies that approach that Heisenberg limit (as defined above).

For instance, efficiencies approaching the Heisenberg limit can be achieved when the number of measurements per repetition is much smaller than the maximum repetitions. But in this limit, aliasing of periodic calibration can also pose challenges. This is because the measured value can be a periodic function of the gate parameter. If the amplification factor (e.g., number of gate cycles) is increased exponentially fast, the number of possible solutions also grows exponentially. An iterative next step estimation procedure as outlined below that depends explicitly on the previous step estimation can solve this aliasing problem such that the efficiency of the calibration protocol is increased and can approach the Heisenberg limit.

In some embodiments, the calibration protocol can exponentially increase the number of gate cycles k for each measurement instance. For instance, a number of gate cycles k for a measurement instance can increase by an exponential factor relative to a number of gate cycles for a previous measurement instance. As one example, the value of k can increase as 2, 4, 8, 16, 32, 64 and so forth.

Figure 18:
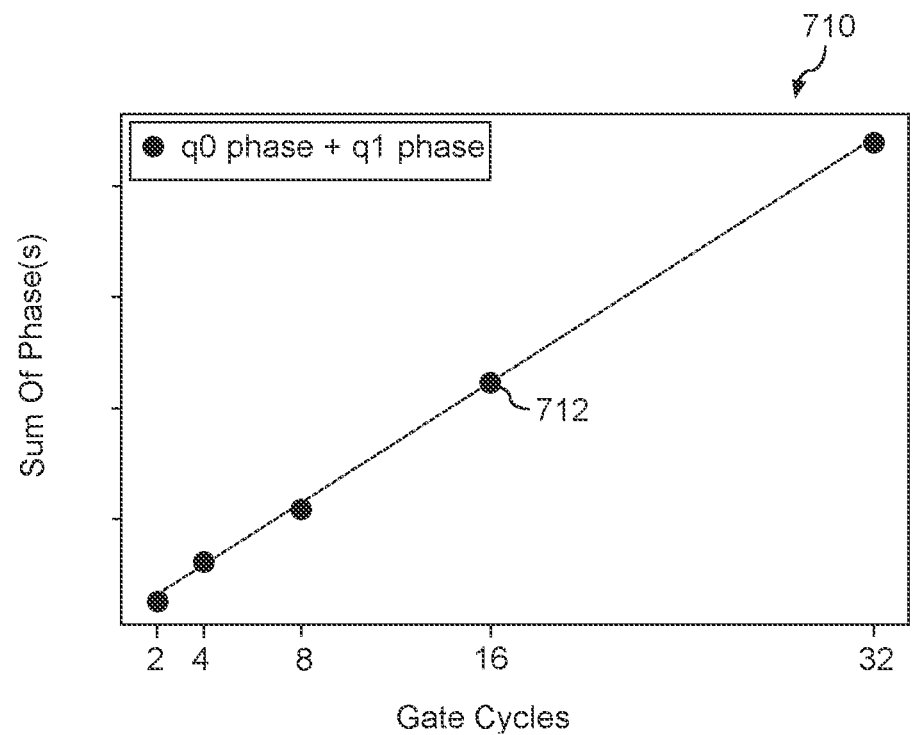
FIG. 18 depicts a representation of a function correlating a sum of phases of a first qubit and a second qubit according to example embodiments of the present disclosure.

For example, FIG. 18 depicts a graphical representation of an example function 710 correlating a sum of the first phase of a first qubit and the second phase of a second qubit with exponentially increasing k. FIG. 18 the plots number of gate cycles along the horizontal axis and sum of the first phase and the second phase along the vertical axis. Each point 712 represents the sum of the first phase and the second phase for a certain value of k, which is exponentially increasing. The first gate parameter $\psi$ can be determined from points 712 as discussed above with reference to FIGS. 5-7.

Figure 19:
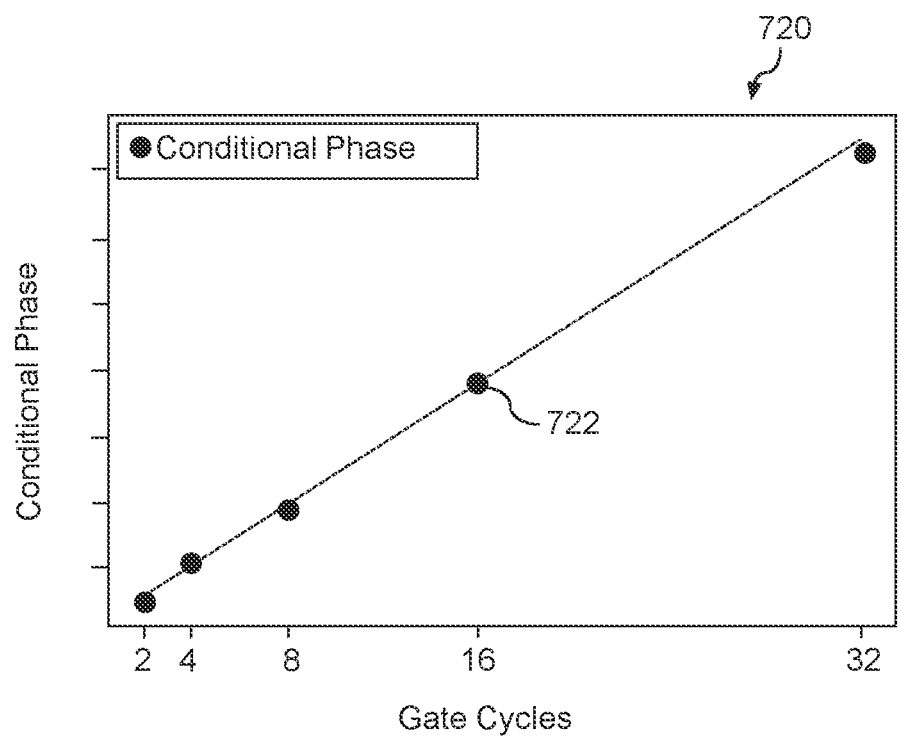
FIG. 19 depicts a representation of a function correlating a conditional phase according to example embodiments of the present disclosure.

As another example, FIG. 19 depicts a graphical representation of an example function 720 correlating a conditional phase of a qubit with exponentially increasing k. FIG. 19 plots the number of gate cycles along the horizontal axis and conditional phase along the vertical axis. Each point 722 represents the conditional phase for a certain value of k, which is exponentially increasing. The second gate parameter $\Phi$ can be determined from points 722 as discussed above with reference to FIGS. 8-10.

In some embodiments, to increase efficiency, the calibration protocol can apply recursive updates to infer parameters for each measurement instance to reduce aliasing in the periodic functional dependence of the gate parameter and measurements. For instance, at each new measurement instance, a parameter estimation for the measurement instance can be chosen to be within an uncertainty range given by a periodicity of a previous measurement instance. For trigonometric functions, since the periodicity is typically $n*\pi/k$ for gate cycles k and integer n, the uncertainty range can scale as $O(1/k)$.

As an example, the following method demonstrates this technique for determining the third gate parameter $\varphi$ and the fourth gate parameter $\theta$. First, gate cycles are set for exponentially increasing amplification factors k according to $k=2^i$ for $i=\{0, 1, \ldots d\}$, where d is the number of different amplification factors. An estimate is obtained for $\alpha 0 - \alpha 1$ and $\theta$. For each amplification factor repeat the measurement instance $M_i$ times, where:

$$M_i = a(2^k - i) + b$$

where a and b are constants.

A transition probability that the quantum state of the first qubit and the second qubit will change from 0>|0> to 0>|1> depends on the third gate parameter $\varphi$ and the fourth gate parameter $\theta$ as follows:

$$P_{01 \to 10} = \left| \text{Sin}[2^i \Omega] \frac{\text{Sin}[\theta]}{\sqrt{1 - \text{Cos}[\theta]^2 \text{Cos}[\varphi + f]^2}} \right|^2$$

An inversion is performed using the rough estimate of $\varphi$ and $\theta$ to update $\Omega$, which in turn depends on parameters as $$\Omega = \frac{1}{2^{i+1}} \text{ArcCos}\left[ 1 - \frac{2(1 - \text{Cos}[\theta]^2 \text{Cos}[\varphi - \beta]^2) P_{01 \to 10}}{|\text{Sin}[\theta]|^2} \right]$$

This can be repeated for a a different $\beta'$, to obtain a new estimate $\Omega(\beta')$. The third and fourth gate parameters $\varphi$ and $\theta$ can be updated with:

$$\varphi = \text{ArcTan}\left[ \frac{\text{Cos}[f']\text{Cos}[\Omega(f)] - \text{Cos}[\Omega(f')]\text{Cos}[f]}{\text{Sin}[f']\text{Cos}[\Omega(f)] - \text{Cos}[\Omega(f')]\text{Sin}[f]} \right]$$

$$\theta = \text{ArcCos}\left[ \frac{\text{Cos}[\Omega(f)]}{\text{Cos}[\varphi + \beta]} \right]$$

The data set of measurement instances associated with a previous iteration can be used to estimate $\Omega(\beta)$ and $\Omega(\beta')$ to the highest accuracy. The final estimate on θ and φ can be calculated similarly except using the last step estimate of Ω(β) and Ω(β').

Figure 20:
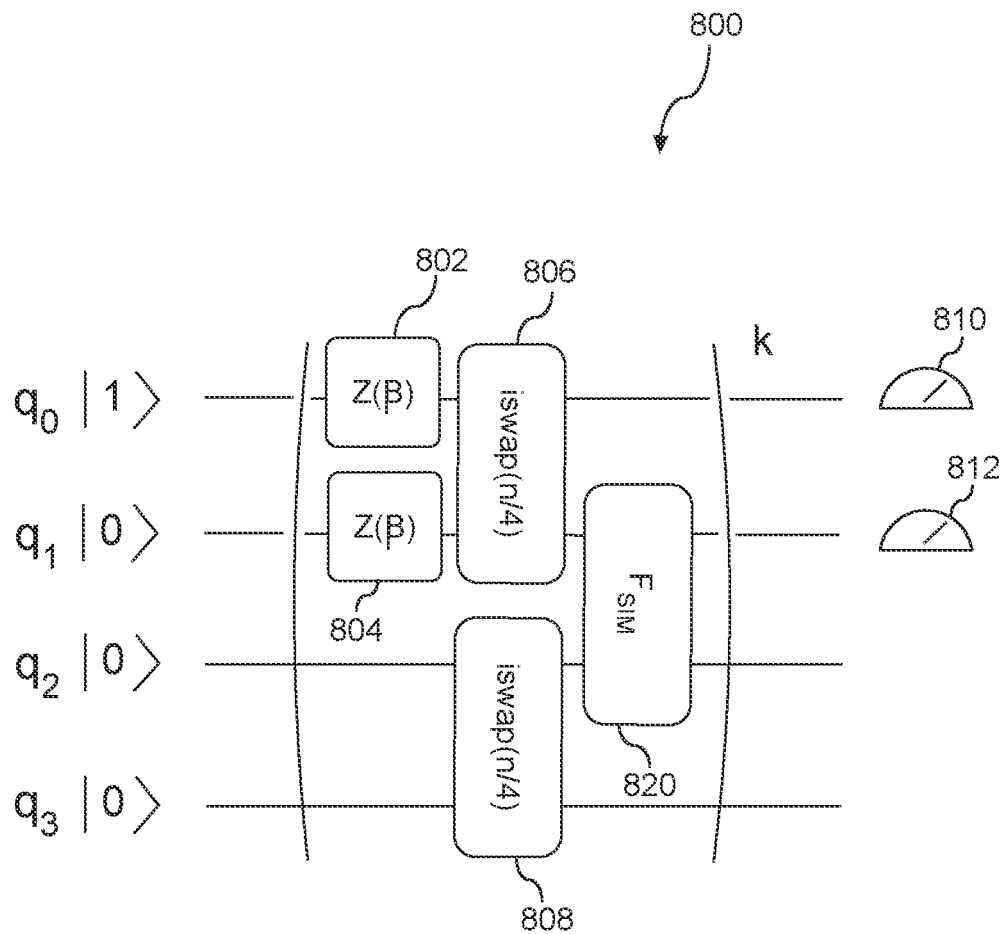
FIG. 20 depicts an example quantum gate modeling parasitic interaction between qubits in a quantum circuit according to example embodiments of the present disclosure.

In some embodiments, the calibration protocol according to example aspects of the present disclosure can be used to estimate gate parameters for parasitic interactions among a plurality of qubits in a quantum system. For instance, FIG. 20 depicts an example quantum circuit 800 implemented on four qubits $q_0$, $q_1$, $q_2$, and $q_3$. In this example, the quantum circuit 800 can include a Z rotation gate 802 on the first qubit $q_0$ and a Z rotation gate 804 on the second qubit $q_1$. The quantum circuit 800 can include an iSWAP gate on the first qubit $q_0$ and the second qubit $q_1$. The quantum circuit 800 can include an iSWAP gate on the third qubit $q_2$ and the fourth qubit $q_3$. The quantum circuit 800 can result in a parasitic qubit-to-qubit interaction between, for instance, the second qubit $q_1$ and the third qubit $q_2$. This parasitic interaction can be modeled as a unitary gate $U_{FSIM}$ 820. Parameters of this gate can be determined according to example aspects of the present disclosure. In this way, the calibration protocol(s) according to example aspects of the present disclosure can be used to determine characteristics of and/or reduce errors attributable to parasitic interaction among qubits during implementation of a quantum circuit.

Aspects of the present disclosure have been discussed with reference to calibrating a two-qubit composite gate for purposes of illustration and discussion. As demonstrated below, the calibration protocol(s) according to example embodiments of the present disclosure can be used for calibration of composite gates of any higher order (e.g., three-qubit composite gate, etc.).

A number-conserving two-qubit gate (generalized fSim gate) take the following form in the basis |00>, |01>, |10>, |11>, $$G_{fSim}(\theta,\delta,\chi,\gamma,\phi) = \begin{pmatrix} 1 & 0 & 0 & 0 \\ 0 & e^{-i(\gamma+\delta)}\cos\theta & -i\,e^{-i(\gamma-\chi)}\sin\theta & 0 \\ 0 & -i\,e^{-i(\gamma+\chi)}\sin\theta & e^{-i(\gamma-\delta)}\cos\theta & 0 \\ 0 & 0 & 0 & e^{-i(2\gamma+\phi)} \end{pmatrix}, \quad (1)$$

where $0 \leq \theta \leq \pi/2$ is the iSWAP angle, φ is the controlled phase angle, and δ, χ, γ are single-qubit phase factors. Single-qubit Z rotations on two-qubits can be expressed as $$R_z(\zeta_0, \zeta_1) \sim \begin{pmatrix} 1 & 0 & 0 & 0 \\ 0 & e^{i\zeta_1} & 0 & 0 \\ 0 & 0 & e^{i\zeta_0} & 0 \\ 0 & 0 & 0 & e^{i(\zeta_0+\zeta_1)} \end{pmatrix} = G_{fSim}(0, \eta, 0, -\zeta, 0), \quad (2)$$

where ~ denotes equivalence up to an overall phase, $\zeta=(\zeta_0+\zeta_1)/2$, and $\eta=(\eta_0-\zeta_1)/2$.

The generalized fSim gate (1) can be decomposed into $$G_{fSim}(\theta,\delta,\chi,\gamma,\phi) \sim R_z(-\gamma,-\gamma)R_z(\beta,-\beta)fSim(\theta,\phi)R_z(\alpha,-\alpha), \quad (3)$$

where $\alpha=(\delta+\chi)/2$, $\beta=(\delta-\chi)/2$, and fSim $(\theta,\phi)=G_{fSim}(\theta,0,0,0,\phi)$ is the standard fSim gate. A cycle consisting one $G_{fSim}$ gate prepended by two single-qubit Z rotations reads $$G_{fSim}(\theta,\delta,\chi,\gamma,\phi)R_z(\zeta_0,\zeta_1) = G_{fSim}(\theta,\delta+\eta,\chi+\eta,\gamma-\zeta,\phi), \quad (4)$$

This leads to the following transformation rules for the parameters, $$\hat{\theta}=\theta,\ \hat{\delta}=\delta+\eta,\ \hat{\chi}=\chi+\eta,\ \hat{\gamma}=\gamma-\zeta,\ \hat{\phi}=\phi, \quad (5)$$

where Greek letters with hats represent parameters of the gate.

As described herein, one example method for calibrating quantum gates robustly and precisely according to example embodiments of the present disclosure is by repeating them by many times (e.g., for a plurality of gate cycles). The coherent amplification of the eigenvalues of the gates allows one to measure them to the Heisenberg limit. Since the eigenvalues are amplified, it is also more robust to state preparation and measurement errors.

The n-th fold product of the generalized fSim gate reads $$G_{fSim}(\theta,\delta,\chi,\gamma,\phi)^n = \mathrm{diag}(1, e^{-in\gamma}u(\theta,\delta,\chi)^n, e^{-in(2\gamma+\phi)}), \quad (6)$$

where u is the 2×2 matrix $$u(\theta, \delta, \chi) = \begin{pmatrix} e^{i\delta}\cos\theta & -i\,e^{i\chi}\sin\theta \\ -i\,e^{-i\chi}\sin\theta & e^{-i\delta}\cos\theta \end{pmatrix} \quad (7)$$

$$= I\cos\theta\cos\delta - i(Z\cos\theta\sin\delta + X\sin\theta\cos\chi - Y\sin\theta\sin\chi). \quad (8)$$

The n-th power of u can be solved analytically using the Pauli representation $$u(\theta, \delta, \chi) = \quad (9)$$

$$I\cos(n\,\Omega) - i\frac{\sin(n\,\Omega)}{\sin\Omega}(Z\cos\theta\sin\delta + X\sin\theta\cos\chi - Y\sin\theta\sin\chi)$$

$$= \begin{pmatrix} \cos(n\,\Omega) - i\lambda_n\cos\theta\sin\delta & -i\,\lambda_n e^{i\chi}\sin\theta \\ -i\,\lambda_n e^{-i\chi}\sin\theta & \cos(n\,\Omega) + i\lambda_n\cos\theta\sin\delta \end{pmatrix}, \quad (10)$$

where $$\cos\omega = \cos\theta\cos\delta, \lambda_n = \sin(n\Omega)/\sin\Omega, \quad (11)$$

and floquet frequency $\Omega \in [\theta, \pi-\theta]$. The floquet frequency Ω can be measured with extremely high precision using phase amplification. To estimate both θ and δ, the cycle in Eq. (4) should be considered for at least two different values of $\eta=(\eta_0-\eta_1)/2$. To simplify notation, the cycle is denoted as $$\hat{U} \equiv G_{fSim}(\theta,\delta,\lambda,\gamma,\phi)R_z(\zeta_0,\zeta_1) \quad (12)$$

$$= \mathrm{diag}(1, e^{-i\hat{\gamma}}u(\theta,\hat{\delta},\hat{\chi}), e^{-i(2\hat{\gamma}+\phi)}). \quad (13)$$

The floquet frequency corresponding to $u(\theta,\hat{\delta},\hat{\chi})$ is $$\cos[\hat{\Omega}(\eta)] = \cos\theta\cos\hat{\delta} = \cos\theta\cos(\delta+\eta). \quad (14)$$

For η≠η', one can estimate the parameter δ by using $$\tan\delta = \frac{\cos[\hat{\Omega}(\eta)]\cos\eta' - \cos[\hat{\Omega}(\eta')]\cos\eta}{\cos[\hat{\Omega}(\eta)]\sin\eta' - \cos[\hat{\Omega}(\eta')]\sin\eta}. \quad (15)$$

Knowing δ, θ can be estimated by simply putting its value into Eq. (14). The hidden assumptions here are: 1. the gate $G_{fSim}(\theta,\delta,\chi,\gamma,\phi)$ does not depend on $\zeta_0$ and $\zeta_1$, i.e., pulse bleeding is negligible; 2. the single-qubit Z rotations can be implemented perfectly. Both are pretty reasonable assumptions with current superconducting qubits.

To calibrate the fSim gate, the cycle (4) is repeated for $n_k$ times for k=0, 1, ..., κ−1. The repetition number $n_k$ is approximately an exponential function of k, i.e., $$\log n_k \approx \lambda k, \quad (16)$$

where λ is a constant. The advantage of this choice is that less quantum circuits can be implemented to get a desired precision while keeping track of how many times the accumulated phase over an 2π interval. Three setup instances are to calibrate different parameters in the generalized fSim gate. These setup instances can be meant to be implemented in a particular order to get improved results.

The first instance, instance 0, considers the following matrix element:

$$|<00|R_x(\pi,0)\hat{U}^n R_x(0,\pi)|00>|=|<1|\hat{u}^n|0>|=|\sin(n\hat{\Omega})\sin\theta/\sin\hat{\Omega}|, \quad (17)$$

where $\hat{u}^n$ is a shorthand for $u(\gamma,\hat{\delta},\hat{\chi})^n$. $|<1|\hat{u}^n|0>|=|\sin\theta|$ is for n=1 and $|<1|\hat{u}^n|0>|=|\sin(2\theta)|\cos(\delta+\eta)|$ for n=2. $|<1|\hat{u}^n|0>|$ can contain information of the floquet frequency $\hat{\Omega}$ and can be used to infer the values of $\theta$ and $\delta$ using Eqs. (14). This instance has the advantage that the output state can be post selected in the subspace of two basis states $|00>$ and $|11>$ which is robust to single bit-flip errors. However, in some cases, it may only be used to estimate $\gamma$ and $\delta$.

For increased sensitivity, $\eta$ can be chosen such that small changes of $\theta$ and $\delta$ cause big changes in the measurement probability $|<1|\hat{u}^n|0>|^2$. For large n, $\sin\hat{\Omega}$ is a slow varying function compared to $\sin(n\hat{\Omega})$ and Eq. (17) is approximated by $$|<1|\hat{u}^n|0>|^2 \propto \sin(n\hat{\Omega})^2 = 1-\cos(\theta)^2\cos(\hat{\delta})^2. \quad (18)$$

where $\hat{\delta}=\delta+\eta$. To better estimate $\theta$, $\eta$ can be chosen such that $|\cos\hat{\delta}|$ is maximized or near maximized. For better estimation of $\delta$, an optimal choice of $\eta$ satisfies $$\delta+\eta=\pi/4 (\bmod \pi/2). \quad (19)$$

This choice can be used because it can be more robust in practice, (e.g., there are more margins that one can get an estimation close to the correct values when errors exist). This can be achieved by maximally separating the four possible values of $\delta$ with the same value of $|\cos\hat{\delta}|$ in an interval of $2\pi$.

The floquet frequency $\hat{\Omega}$ can be estimated for some value of $\eta$ by running the circuit at different values of n and then estimating $\theta$ and $\delta$. In some cases, this can pose challenges. First, the value of $|<1|\hat{u}^n|0>|$ can be small and susceptible to errors. Second, the sensitivity of estimator can be low for some values of k. These challenges can be addressed by using an adaptive approach, where the values of $\eta$ are chosen based on the current estimates of $\theta$ and $\delta$. To increase the robustness, estimates of $\theta$ and $\delta$ are updated using data from the current step as well as former ones. The procedure can is as follows. (1) Get the values of $\eta$ for step k using Eq. (19) based on estimates of $\theta$ and $\delta$ obtained in step k−1; (2) Run the calibration circuits with these values of $\eta$ and collect data; and (3) Update the estimates of $\theta$ and $\delta$ using the data obtained at step k and several previous steps, e.g., k−2, k−1, and k.

The second instance, instance 1, can be used to estimate $\theta$, $\delta$, and $\gamma$ with high precision. It can also be used to estimate $\chi$. Consider the two matrix elements $$|>00|R_x(\pi/2,0)\hat{U}^n R_x(0,\pi/2)|00>|=|\tfrac{1}{2}e^{in\hat{\gamma}}-<1|\hat{u}^n|0>|, \quad (20)$$

$$|<01|R_x(\pi/2,0)\hat{U}^n R_x(0,\pi/2)|00>|\tfrac{1}{2}|<0|\hat{u}^n|0>|. \quad (21)$$

The value of $|<0|\hat{u}^n|0>|$ can be estimated by the measurement results directly using Eq. (21), and the value of $|<1|\hat{u}^n|0>|$ can be obtained with the simple algebra $|<0|\hat{U}^n|0>|^2+|<1|\hat{u}^n|0>|^2=1$. Knowing $|<1|\hat{u}^n|0>|$, Eq. (20) can be used to estimate the relative phase $$\mu = n\hat{\gamma} - \arg(<1|\hat{u}^n|0>), \quad (22)$$

An advantage of using the particular matrix element $<1|\hat{u}^n|0>$ is that its phase is relatively stable $$<1|\overline{u}^n|0>=\operatorname{sgn}\lambda_n e^{-i(\chi+\eta+\pi/2)}|<1|\hat{u}^n|0>|, \quad (23)$$

where $\chi$ is fixed and $\eta$ can be controlled with high precision. The phase of the matrix element is $$\arg(<1|\hat{u}^n|0>)=-(\chi+\eta+\pi\operatorname{sgn}\lambda/2), \quad (24)$$

and therefore $$\mu=(n\gamma+\chi)-n\hat{\zeta}+\eta+\pi\operatorname{sgn}\lambda/2. \quad (25)$$

Knowing $\mu$ for different values of n can provide for estimation of the values of $\chi$ and $\gamma$ with a linear fit. The relative phase $\mu$ can be solved using the relation $$|e^{i\mu}-r|=m \Rightarrow 1-2r\cos\mu+r^2=m^2, \quad (26)$$

where $r=|<1|\hat{u}^n|0>|$ and $m=2|<00|R_x(\pi/2,0)\hat{U}^n R_x(0,\pi/2)|00>|$ for this instance.

The values of $\mu$ can be chosen such that $|<1|\hat{u}^n|0>|$ is maximized or near maximized. $\zeta$ can be chosen such that $\mu \approx \pm\pi/2$. These choices can increase the robustness of the estimator as well as precision.

The third instance, instance 2, In instance 2, considers the matrix elements $$|<00|R_x(\pi,\pi/2)\hat{U}^n R_x(\pi/2,\pi)|00>|=\tfrac{1}{2}|e^{-in(\gamma+\phi)}-<1|\hat{u}^n|0>|, \quad (27)$$

$$|\{10|R_x(\pi,\pi/2)\hat{U}^n R_x(\pi/2,\pi)|00>|=\tfrac{1}{2}|(0|\hat{u}^n|0>|. \quad (28)$$

This instance can provide for estimation of the parameter with high precision by first estimating the relative phase $$v=-n(\hat{\gamma}+\phi)-\arg(<1|\hat{u}^n|0>) \quad (29)$$

$$=-n(\gamma+\phi)+\chi+n\hat{\zeta}+\eta+\pi\operatorname{sgn}\lambda/2. \quad (30)$$

Figure 21:
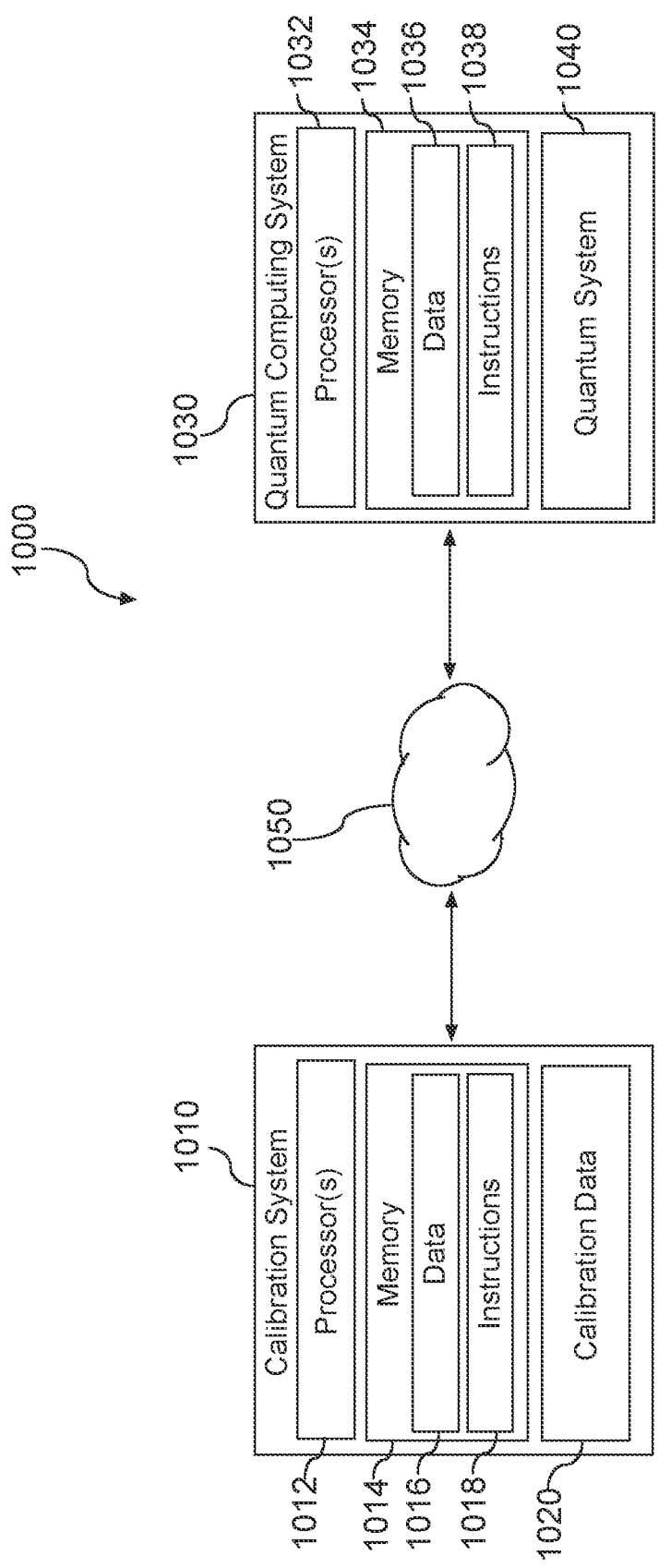
FIG. 21 depicts an example computing system according to example embodiments of the present disclosure.

FIG. 21 depicts a block diagram of an example computing system 1000 that can be used to implement the systems and methods according to example embodiments of the present disclosure, such as the system discussed with reference to FIG. 1. The system 1000 includes a calibration system 1010 and a quantum computing system 1030 that are communicatively coupled over a network 1050. One or more aspects of any of the methods described herein can be implemented on the calibration system 1010 and/or the quantum computing system 1030.

The calibration system 1010 can include any type of computing device (e.g., classical computing device). The calibration system 1010 includes one or more processors 1012 and a memory 1014. The one or more processors 1012 can include any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage mediums, such as RAM, ROM, EEPROM, EPROM, flash memory devices, magnetic disks, etc., and combinations thereof. The memory 1014 can store data 1016 (e.g., qubit parameters, measurements, etc.) and instructions 1018 which are executed by the processor 1012 to cause the calibration computing device 1010 to perform operations, such as one or more aspects of any of the method disclosed herein. The calibration system 1010 can be configured to process calibration data 1020 obtained by measuring a state of a quantum system (e.g., quantum system 1040) to determine gate parameters of a model of a composite gate according to example embodiments of the present disclosure.

The quantum computing system 1030 includes one or more processors 1032 and a memory 1034. The one or more processors 1032 can include suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage mediums, such as RAM, ROM, EEPROM, EPROM, flash memory devices, magnetic disks, etc., and combinations thereof. The memory 1034 can store data 1036 and instructions 1038 which are executed by the processor 1032 to cause the quantum computing system 1030 to perform operations, such as implementation of a quantum circuit having one or more quantum gates on a quantum system 1040 having a plurality of qubits and obtaining associated measurements. The quantum computing system 1030 can be similar to the quantum computing system discussed and described with reference to FIG. 1. Other suitable quantum computing systems can be used without deviating from the scope of the present disclosure.

The network 1050 can be any type of communications network, such as a local area network (e.g., intranet), wide area network (e.g., Internet), or some combination thereof and can include any number of wired or wireless links. In general, communication over the network 1050 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for calibrating a quantum computing system used to implement a quantum circuit on a quantum system having a plurality of qubits, the quantum circuit comprising a composite quantum gate, the method comprising:
   accessing, by one or more computing devices, a unitary gate model describing the composite quantum gate, the unitary gate model comprising a plurality of gate parameters;
   amplifying, using an amplification factor, the plurality of gate parameters via implementing, by the one or more computing devices, the composite quantum gate for a plurality of gate cycles;
   after amplifying the plurality of gate parameters, measuring, by the one or more computing devices, a state of the quantum system;
   determining, by the one or more computing devices, a value for at least one of the plurality of gate parameters based on a measurement of the state of the quantum system; and calibrating, by the one or more computing devices, the composite quantum gate for the quantum computing system based on the value for the one plurality of gate parameters.

2. The method of claim 1, wherein obtaining, by the one or more computing devices, a measurement of a state of the quantum system comprises:
obtaining a measurement of the state of the quantum system for each of a plurality of measurement instances;
wherein each measurement instance is associated with a different number of gate cycles.

3. The method of claim 2, wherein a number of gate cycles for at least one measurement instance increases by an exponential factor relative to a number of gate cycles for a previous measurement instance.

4. The method of claim 1, wherein the composite quantum gate represents a parasitic interaction among a plurality of qubits in the quantum system.

5. The method of claim 1, wherein the unitary gate model is modeled as a first Z rotation angle gate for a first qubit, a second Z rotation angle gate for a second qubit, an iswap gate for the first qubit and the second qubit, and a controlled phase gate for the first qubit and the second qubit.

6. The method of claim 1, wherein the unitary gate model comprises a first parameter, a second parameter, a third parameter, a fourth parameter, and a fifth parameter, wherein determining the plurality of gate parameters comprises determining each of the first parameter, the second parameter, the third parameter, the fourth parameter, and the fifth parameter.

7. The method of claim 6, wherein determining the first parameter comprises:
determining a first phase of a first qubit as a function of k, where k is a number of gate cycles;
determining a second phase of a second qubit as a function of k;
determining a function correlating a sum of the first phase and the second phase with k; and
determining the first parameter based at least in part on a characteristic associated with the function correlating the sum of the first phase and the second phase with k.

8. The method of claim 7, wherein the first parameter is determined based on a slope associated with the function correlating the sum of the first phase and the second phase with k.

9. The method of claim 6, wherein determining the second parameter comprises:
determining a conditional phase for a second qubit when a first qubit is in a |1> state;
determining a function correlating the conditional phase with k, where k is a number of gate cycles;
determining the second parameter based at least in part on a parameter associated with the function correlating the conditional phase with k.

10. The method of claim 9, wherein the second parameter is determined based on a slope associated with the function correlating the conditional phase with k.

11. The method of claim 6, wherein determining the third parameter and determining the fourth parameter comprises:
obtaining calibration data indicative of a state of a first qubit and a second qubit as a function of both a z-rotation angle applied to the first qubit and k, where k is a number of gate cycles;
fitting the calibration data with an oscillation frequency function based on an oscillation frequency and k;
determining a function correlating the oscillation frequency with the z-rotation angle; and
determining the third parameter based on a first characteristic of the function correlating the oscillation frequency with the z-rotation angle; and
determining the fourth parameter based on a second characteristic of the function correlating the oscillation frequency with the z-rotation angle.

12. The method of claim 6, wherein the method comprises:
obtaining calibration data indicative of a state of a first qubit and a second qubit at a fixed rotation angle applied to the first qubit and as a function of k, where k is a number of gate cycles, the calibration data comprising a first probability associated with the first qubit and the second qubit being in a same state and a second probability associated with the first qubit and the second qubit in a different state;
determining the fifth parameter based at least in part on the first probability and the second probability.

13. The method of claim 1, wherein for at least one measurement instance, a parameter estimation for the measurement instance is chosen to be within an uncertainty range determined at least in part based on a periodicity associated with a previous measurement instance.

14. The method of claim 1, wherein determining, by the one or more computing devices, at least one of the plurality of gate parameters comprises determining, by the one or more computing devices, at least one of the plurality of gate parameters to within a variance.

15. The method of claim 14, wherein the variance is inversely proportional to an amount of time required to perform determining, by the one or more computing devices, at least one of the plurality of gate parameters.

16. The method of claim 14, wherein the variance decreases approximately quadratically faster relative to an estimation process performed using a classical processing algorithm.

17. The method of claim 1, wherein the composite quantum gate is a two-qubit quantum gate.

18. A computing system, comprising:
a quantum computing system having a plurality of qubits;
one or more processors;
one or more memory devices, the one or more memory devices storing computer-readable instructions that when executed by the one or more processors cause the one or more processors to perform operations, the operations comprising:
accessing a gate model describing a composite quantum gate, the gate model comprising a plurality of gate parameters;
amplifying, using an amplification factor, the plurality of gate parameters via implementing the composite quantum gate for a plurality of gate cycles;
after amplifying the plurality of gate parameters, measuring, a state of the quantum computing system;
determining a value for at least one of the plurality of gate parameters based on the measurement of the state of the quantum computing system; and
calibrating the composite quantum gate for the quantum computing system based on the value for the one plurality of gate parameters.

19. The computing system of claim 18, wherein obtaining a measurement of a state of the quantum computing system comprises:

obtaining a measurement of the state of the quantum computing system for each of a plurality of measurement instances;

wherein each measurement instance is associated with a different number of gate cycles.

20. The computing system of claim 19, wherein a number of gate cycles for at least one measurement instance increases by an exponential factor relative to a number of gate cycles for a previous measurement instance.

* * * * *